G. C. BEAL.
Tether.
No. 221,497.　　　　　Patented Nov. 11, 1879.
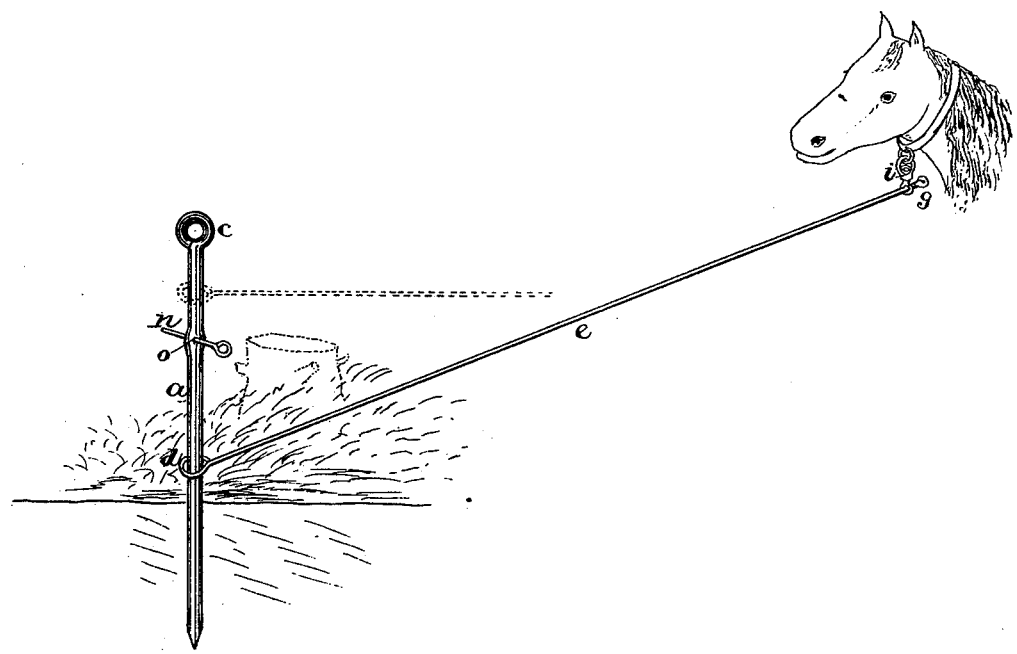
Witnesses:
J. W. Garner
Otto Stein
Inventor:
Geo. C. Beal,
per
F. A. Lehmann.
Atty

UNITED STATES PATENT OFFICE.

GEORGE C. BEAL, OF WASHINGTON, GEORGIA.

IMPROVEMENT IN TETHERS.

Specification forming part of Letters Patent No. 221,497, dated November 11, 1879; application filed October 18, 1879.

*To all whom it may concern:*

Be it known that I, GEORGE C. BEAL, of Washington P. O., in the county of Wilkes and State of Georgia, have invented certain new and useful Improvements in Tethers; and I do hereby declare the following to be a full, clear, and exact description of the invention, such as will enable others skilled in the art to which it pertains to make and use it, reference being had to the accompanying drawing, which forms part of this specification.

My invention relates to an improvement in tethers; and it consists in the combination of a stake that is to be driven into the ground, an iron rod of any suitable length, that is pivoted at one end on the stake, and a swivel that can be moved back and forth on the rod, and which is fastened to the horse's collar, as will be more fully described hereinafter.

The accompanying drawing represents a perspective of my invention.

*a* represents a pin or stake, which is about four feet long, and which has an enlarged head, *c*, so as to prevent the end *d* of the rod *e* from being raised up over its top. The rod *e* is made of iron, of any desired length or thickness, and has the ring *d* made on its inner end, so as to pass over the stake, and thus pivot the rod upon it. The outer end of the rod is enlarged, as at *g*, so that the swivel *i*, which is to be fastened to the horse's collar, cannot slip off. As this swivel slides freely back and forth on the rod from one end to the other it will be readily seen that the horse can walk in and out from the stake, and can walk freely around the stake in either direction. As the outer end of the rod rises freely upward to any desired distance, the horse is at perfect liberty to play and jump at will, and as it moves in toward the stake the end *d* of the rod rises upward to the top of the stake, so that the head can be raised fully as high as is ever necessary. By using a rigid rod, as is here shown, the horse can never get his foot over it, but carries it with him at every movement of the head, and always in advance and above the feet. By means of the swivel the horse, by getting out to the end of the rod, can turn freely around, and thus reverse his position.

Through the pin or stake *a* is made a hole, *o*, so that if the horse should be staked beside a stump or stone the inner end of the rod can be fastened at or above the hole by means of a pin, *n*, above the level of the stump or stone, and then, as the horse moves around, the rod will be carried over the top of the stump or stone, so that the rod will never catch against it. If so desired, there will be a number of these holes; but where there are no obstructions the horse is as free to roll with this tether as when he is running loose in the field.

Having thus described my invention, I claim—

1. In a tether for animals, the combination of a stake, *a*, provided with the hole *o*, with a rigid rod, *e*, and pin *n*, whereby the inner end of the rod can be supported above the tops of stumps or other obstructions, substantially as shown.

2. The combination, in an animal-tether, of a stake, *a*, a rigid rod, and a swivel, *i*, that is adapted to be fastened to the collar of the animal, substantially as described.

In testimony that I claim the foregoing I have hereunto set my hand this 18:h day of October, 1879.

GEO. C. BEAL.

Witnesses:
F. A. LEHMANN,
OTTO STEIN.